(12) United States Patent
Onno et al.

(10) Patent No.: US 7,571,316 B2
(45) Date of Patent: Aug. 4, 2009

(54) METHOD AND DEVICE FOR TRANSFORMING A DIGITAL SIGNAL

(75) Inventors: Patrice Onno, Rennes (FR); Fabrice Le Leannec, Cesson Sevigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 596 days.

(21) Appl. No.: 10/621,418

(22) Filed: Jul. 18, 2003

(65) Prior Publication Data

US 2004/0042486 A1   Mar. 4, 2004

(30) Foreign Application Priority Data

Jul. 18, 2002   (FR) ................................. 02 09134

(51) Int. Cl.
*H04L 9/00* (2006.01)
(52) U.S. Cl. .................. 713/160; 380/269; 370/466; 725/31
(58) Field of Classification Search ................. 713/160; 380/269
See application file for complete search history.

(56) References Cited

U.S. PATENT DOCUMENTS

| | | | |
|---|---|---|---|
| 4,685,098 A * | 8/1987 | Yoshida .................... 369/59.18 |
| 6,131,161 A | 10/2000 | Linnartz ..................... 713/176 |
| 6,501,860 B1 * | 12/2002 | Charrier et al. ............. 382/240 |
| 7,003,666 B1 * | 2/2006 | Inoue et al. .................. 713/176 |
| 7,184,548 B2 * | 2/2007 | Wee et al. ....................... 380/37 |
| 2002/0027994 A1 * | 3/2002 | Katayama et al. ............ 380/269 |
| 2002/0048319 A1 | 4/2002 | Onno .......................... 375/240 |
| 2002/0051583 A1 | 5/2002 | Brown et al. ................. 382/299 |
| 2002/0191852 A1 | 12/2002 | Le Leannec et al. ......... 382/233 |
| 2003/0018750 A1 | 1/2003 | Onno et al. ................... 709/219 |
| 2003/0128878 A1 | 7/2003 | Leannec et al. .............. 382/233 |

OTHER PUBLICATIONS

Alattar A. M. et al., "Improved Selective Encryption Techniques For Secure Transmittion Of MPEG Video Bit-Streams", Image Processing, 1999. ICIP 99. Proceedings. 1999 International Conference on Kobe, Japan, Oct. 24-28, 1999, Piscataway, NJ, USA IEEE, US, Oct. 24, 1999, pp. 256-260.

Cheng H. et al., "Partial Encryption Of Compressed Images And Videos", IEEE Transactions On Signal Processing, IEEE, Inc., New York, US, vol. 48, No. 8, Aug. 8, 2000, pp. 2439-2451.

* cited by examiner

*Primary Examiner*—Nasser G Moazzami
*Assistant Examiner*—Fikremariam Yalew
(74) *Attorney, Agent, or Firm*—Fitzpatrick, Cella, Harper & Scinto

(57) ABSTRACT

The invention relates to a method of transforming a digital signal for it to be transmitted, the signal being decomposed into several regions each containing digital data, the signal comprising header data specific to each region and which comprise at least one part representing the amplitude of the data of the region considered, wherein the method comprises a step of modifying, among the header data specific to at least one region of the signal, the part of the header data representing the amplitude of the data of the region considered.

30 Claims, 7 Drawing Sheets

METHOD AND DEVICE FOR TRANSFORMING A DIGITAL SIGNAL

The present invention relates to a method and a device for transforming a digital signal for it to be transmitted, the signal being decomposed into several regions each containing digital data, the signal comprising header data specific to each region and which comprise at least one part representing the amplitude of the data of the region considered.

The invention also relates to a method and a device for transforming a digital signal after its reception.

The invention finds application in particular in the field of image processing and, for example, in the field of the processing of images conforming to the JPEG2000 standard.

According to that standard, a compressed image digital signal has a general structure comprising header data constituting a main header and a body which comprises, in compressed form, data representing physical quantities which are the pixels and which are grouped together into blocks of data known as "code-blocks", arranged in the signal.

The body of the signal corresponds at least to one tile which represents in a compressed manner a rectangular portion of the original image signal. Each tile is formed of tile header data and a tile body comprising the compressed code-blocks corresponding to the tile considered.

More particularly, the body of each tile comprises data packets which are each constituted by packet header data and a packet body.

The packet body in turn contains several compressed code-blocks and the header data of the packet contain in particular a list of all the blocks contained in the packet body.

Each code-block of compressed data is a compressed representation of an elemental rectangular portion of the original image signal which has been transformed, in known manner, into frequency sub-bands, for example, by a discrete wavelet transform.

It should be noted that each code-block is compressed into several quality layers and each quality layer of a block is to be found in a distinct packet.

Each data packet of a compressed image signal in accordance with the JPEG2000 standard thus contains a set of compressed code-blocks each corresponding to a given tile, component (for example: luminance or chrominance), resolution level, quality layer and spatial position or "precinct".

It is known to carry out scrambling or encryption of digital signals, such as of images, before transmitting these signals in order to ensure that non-authorized persons receiving these signals cannot exploit their content.

Furthermore, according to a document entitled "Partial encryption compressed images and videos" by H. Cheng and X. Li, IEEE Transactions on Signal Processing, 48(8) pages 2439-2451, 2000, it is also known to perform partial encryption of video and image signals in order to reduce the time necessary for the operations of encryption and decryption.

The technique proposed makes provision for modifying the entropy encoding unit of the compression device, by which fact the use of a conventional decoder compatible with the JPEG2000 standard for performing the operations of decompression of the image signal is rendered impossible.

A technique for encryption of image signals is also known from the document EP 1033880 published on Sep. 6, 2000 in the name of Sharp KK, which performs in particular a mixing of the data making up an image signal before the entropy encoding of these data.

Here too, the technique envisaged provides for the processing of the whole image and the data so processed are then encoded using an entropy encoding, in a predetermined order which is not the natural order in which they are usually encoded.

This technique is relatively complicated to implement and furthermore gives rise to a relatively long processing time.

The applicant has also realized that the problems referred to above also arise for digital signals which are neither image signals nor video signals and which may, for example, be audio signals, or even signals output from facsimile machines or other communication systems.

The present invention thus aims to remedy at least one of the above drawbacks by providing a method and a device for transforming a digital signal, which are particularly simple and efficient.

The present invention thus relates to a method of transforming a digital signal for it to be transmitted, the signal being decomposed into several regions each containing digital data, the signal comprising header data specific to each region and which comprise at least one part representing the amplitude of the data of the region considered, wherein the method comprises a step of modifying, among the header data specific to at least one region of the signal, the part of the header data representing the amplitude of the data of the region considered.

In a complementary manner, the invention also relates to a device for transforming a digital signal for it to be transmitted, the signal being decomposed into several regions each containing digital data, the signal comprising header data specific to each region and which comprise at least one part representing the amplitude of the data of the region considered, wherein the device comprises means for modifying, among the header data specific to at least one region of the signal, the part of the header data representing the amplitude of the data of the region considered.

Thus, by choosing to modify the part of the header data specific to a region of the signal which represents the amplitude of the data of that region, the data making up the signal is not altered and the structure of the latter is not altered either.

Moreover, the encryption proposed here may be operated over a selected portion or region of the signal and not necessarily over the entire signal, which in itself considerably reduces the time allocated to the encryption operations as well as their complexity.

Similarly, the invention is particularly advantageous in that it is possible to select the region or regions which it is desired to encrypt.

The encryption provided by the invention is preferably performed at the time of the compression operations of the digital signal or else on the digital signal that has already been compressed.

More particularly, the digital data of the signal being digital samples representing physical quantities, the part of the header data representing the amplitude of the samples of the region considered provides a number of bitplanes according to which the amplitudes of the samples are encoded based on the difference between, on the one hand, a number of so-called reference bitplanes, depending on the signal and which is deduced from information present in the signal and, on the other hand, a number of zero bitplanes which is contained in said part of the header data.

In this context, it is thus, for example, provided that the modification step according to the invention modifies the number of zero bitplanes.

The modification of a parameter representing the number of zero bitplanes of the samples of the region considered will give rise, in the signal which will be transmitted, to an erroneous value for the amplitude of these samples.

Thus, at the receiver of such a signal, a conventional decoder will be capable of decoding the modified parameter or parameters according to the invention, but the result of this decoding will be data not corresponding to the real data before their encryption.

In the case of an image signal, the image which will be decompressed in this manner will be blurred and distorted, thereby making its exploitation impossible. It should be noted that, even if the content of the signal may nevertheless be recognized, the quality of reproduction of the latter is nevertheless substantially degraded with respect to the quality which would normally be obtained in the absence of encryption.

More particularly, the modification step according to the invention provides for increasing the number of zero bitplanes with respect to the real number of zero bitplanes of the samples of the region considered.

In this manner, on reception of the signal transformed according to the invention, the number of zero bitplanes of the samples of a region has a certain value which is found to be greater than the real value.

Consequently, at the steps of decompression of the signal, the receiver will take into account the amplitudes of the samples of the region only for a number of bitplanes that is reduced with respect to the real number.

Thus, the amplitudes of the samples obtained after the decompression operations will not reflect the true amplitudes of the samples of the original signal before encryption.

According to one feature, the modification step makes use of at least one transformation key Ku.

This key may also take into account the portion or region of the signal which must be encrypted.

Thus, the transmission of this key to the receiver of the signal indicates to the latter the portion or region which has been encrypted.

According to one feature, the method according to the invention comprises a step of generating a pseudo-random sequence based on the transformation key Ku.

According to another aspect, the invention also relates to a method of transforming a digital signal decomposed into a plurality of regions each containing digital data, the signal comprising header data specific to each region and which comprise at least one part representing the amplitude of the data of the region considered, wherein the method comprises the following steps:

receiving the signal of which the part of the header data representing the amplitude of the data of at least one region has undergone a modification before transmission of said signal, modifying in reverse that modified part of the header data in order to restore said unmodified part of the header data of the signal.

In a complementary manner, the invention also relates to a device for transforming a digital signal decomposed into a plurality of regions each containing digital data, the signal comprising header data specific to each region and which comprise at least one part representing the amplitude of the data of the region considered, wherein the device comprises:

means for receiving the signal of which the part of the header data representing the amplitude of the data of at least one region has undergone a modification before transmission of said signal, means for reverse modification of that modified part of the header data in order to restore said unmodified part of the header data of the signal.

Thus, a receiver of a digital signal transformed according to the invention is capable of restoring the part of the signal which had been modified by simple operations consisting of performing a modification which is the reverse of that applied, at the transmitter, to the part of the header data which represents the amplitude of the data of at least one region of the signal.

The invention implemented in a receiver of the transformed signal according to the invention has the same advantages as those provided by the invention when it is implemented in a signal transmitter, i.e. the simplicity of encryption/decryption provided, the speed with which it is possible to encrypt/decrypt the signal because the data making up the signal are preserved, as is the compression rate in the encrypted signal.

The invention also concerns a communication apparatus comprising a device for transformation of a digital signal as briefly disclosed above.

According to another aspect, the invention also relates to:
an information storage means which can be read by a computer or a microprocessor containing code instructions of a computer program for executing the steps of the method according to the invention as for the one briefly disclosed above, and
a partially or totally removable information storage means which can be read by a computer or a microprocessor containing code instructions of a computer program for executing the steps of the method according to the invention as for the one briefly disclosed above.

According to yet another aspect, the invention relates to a computer program which can be loaded into a programmable apparatus, containing sequences of instructions or portions of software code for implementing steps of the method of the invention as briefly set out above, when said computer program is loaded and executed on the programmable apparatus.

As the features and advantages relating to the digital signal transformation device, to the communication apparatus comprising such a device, to the information storage means and to the computer program are the same as those set out above concerning the method according to the invention, they will not be repeated here.

Other features and advantages of the present invention will emerge more clearly from a reading of the following description, given with reference to the accompanying drawings, in which.

Figure 2:
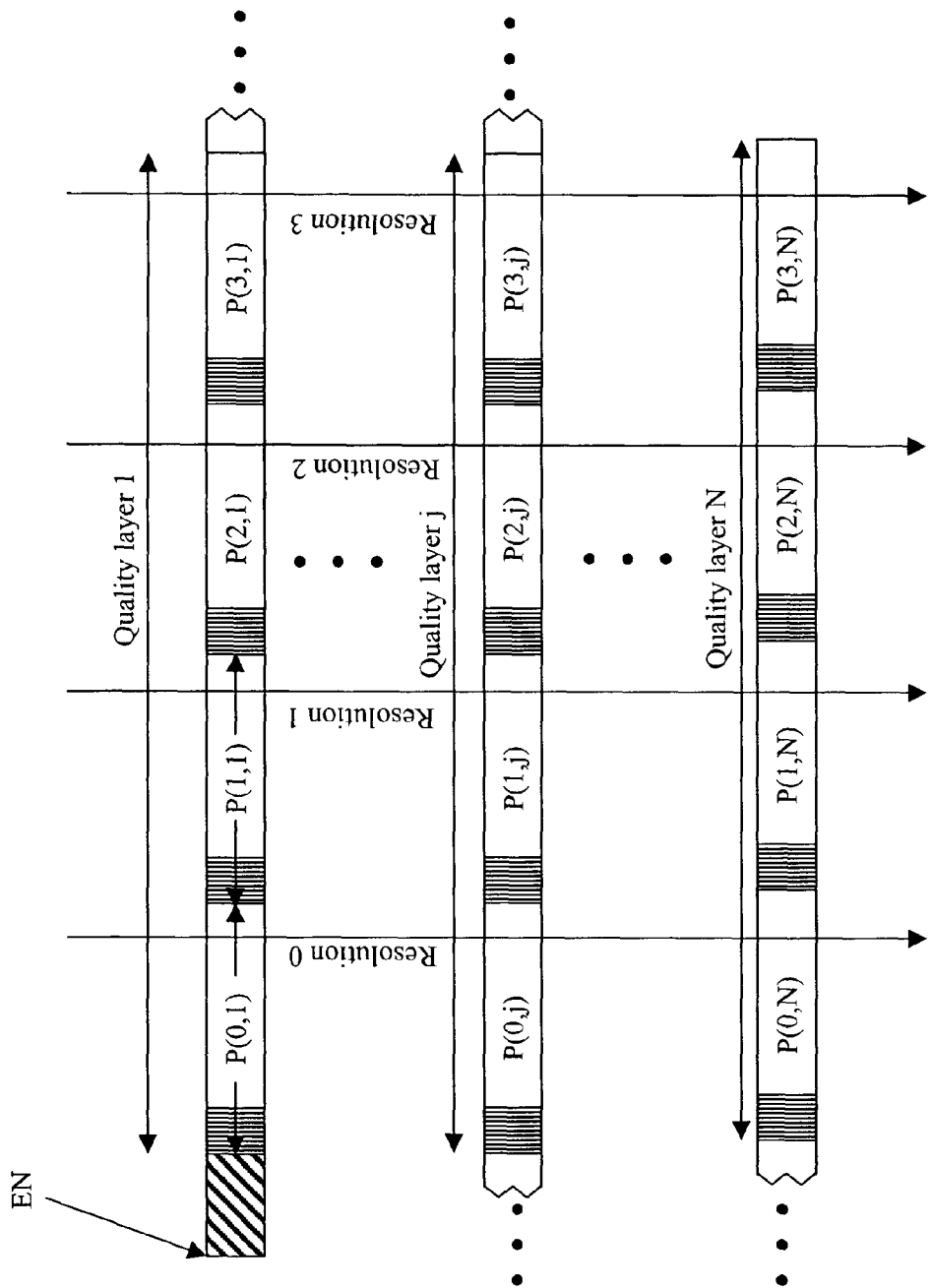
FIG. 2 is a diagram of a bitstream according to the JPEG2000 standard.
Figure 3A:
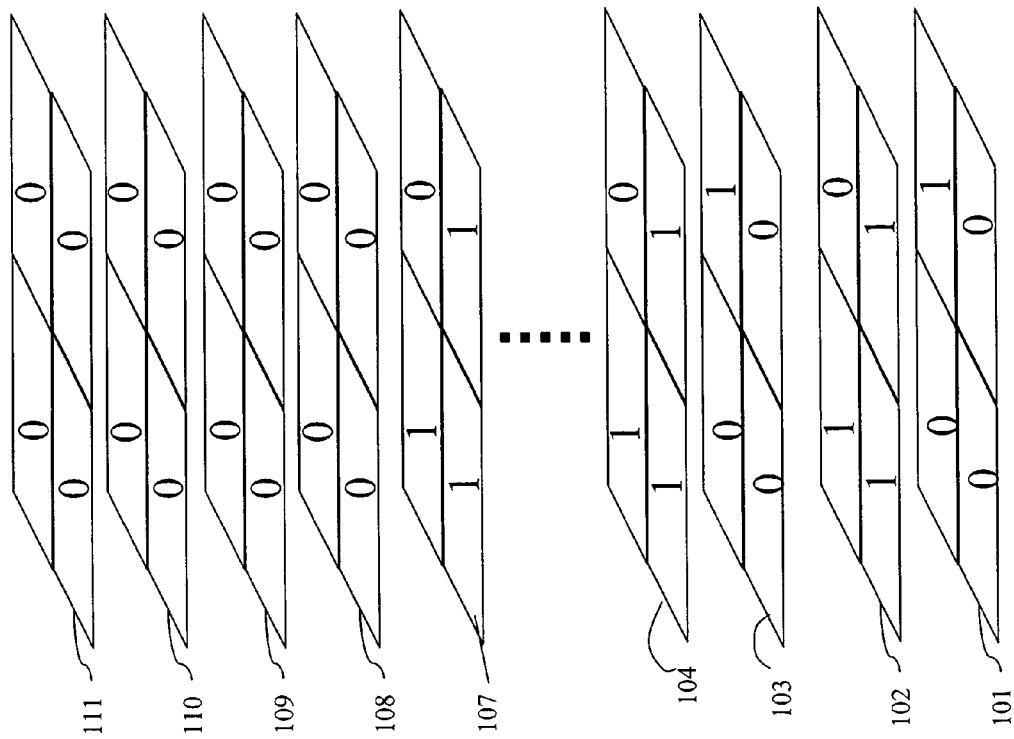
Figure 3B:
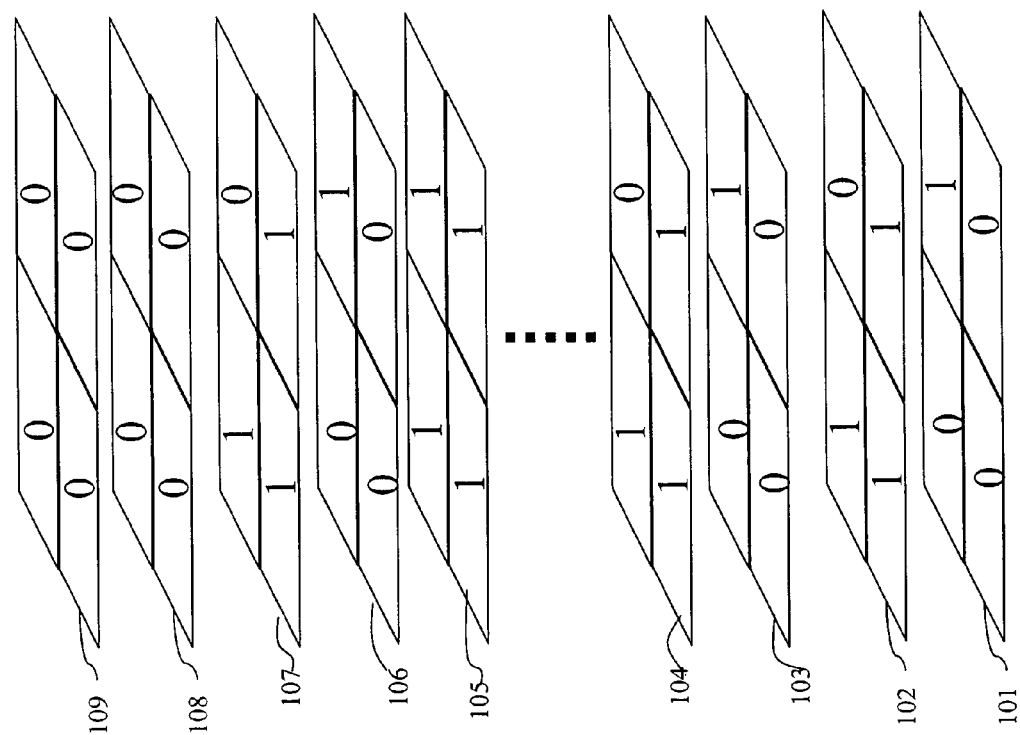
Figure 4:
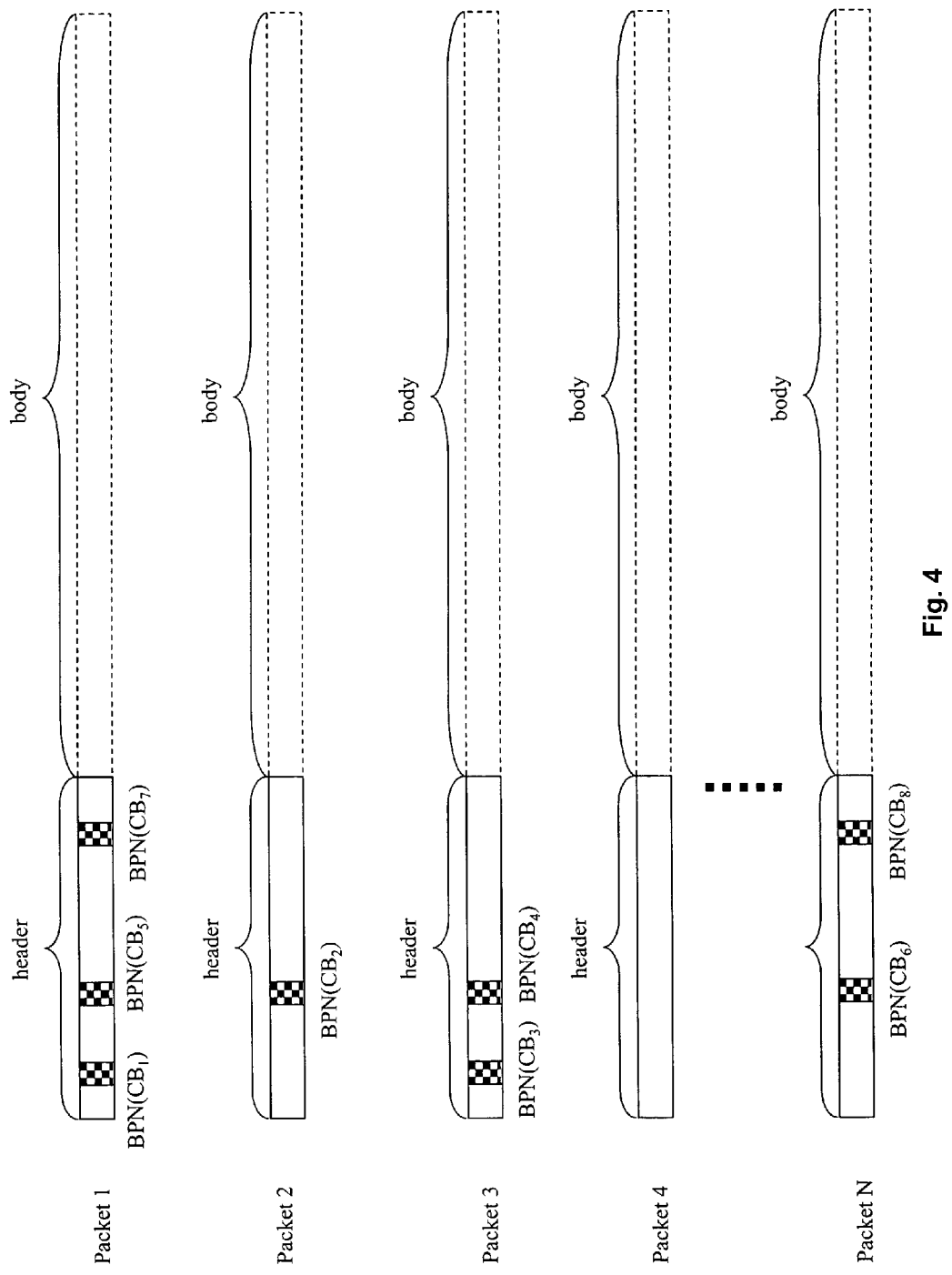
Figure 5:
Figure 6:
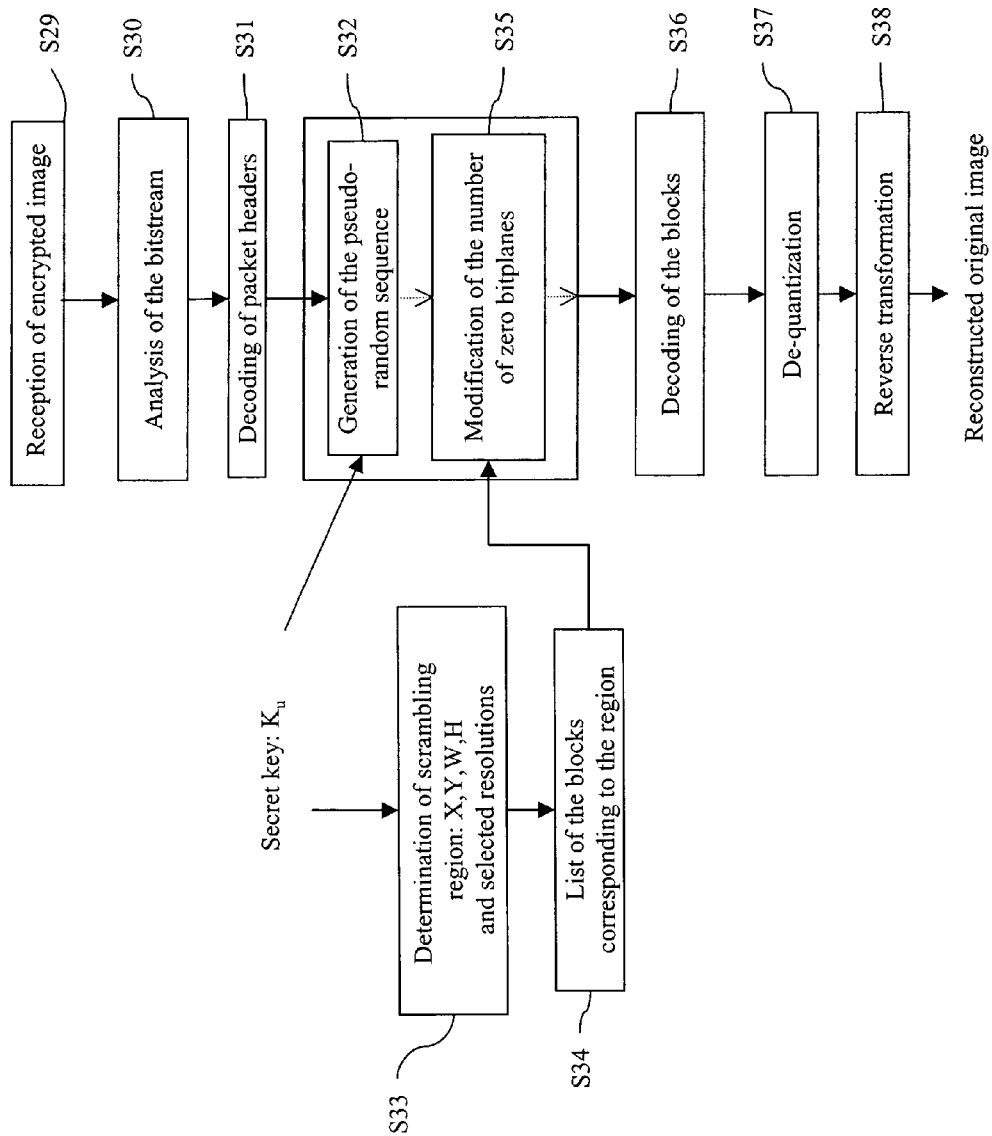
Figure 7:
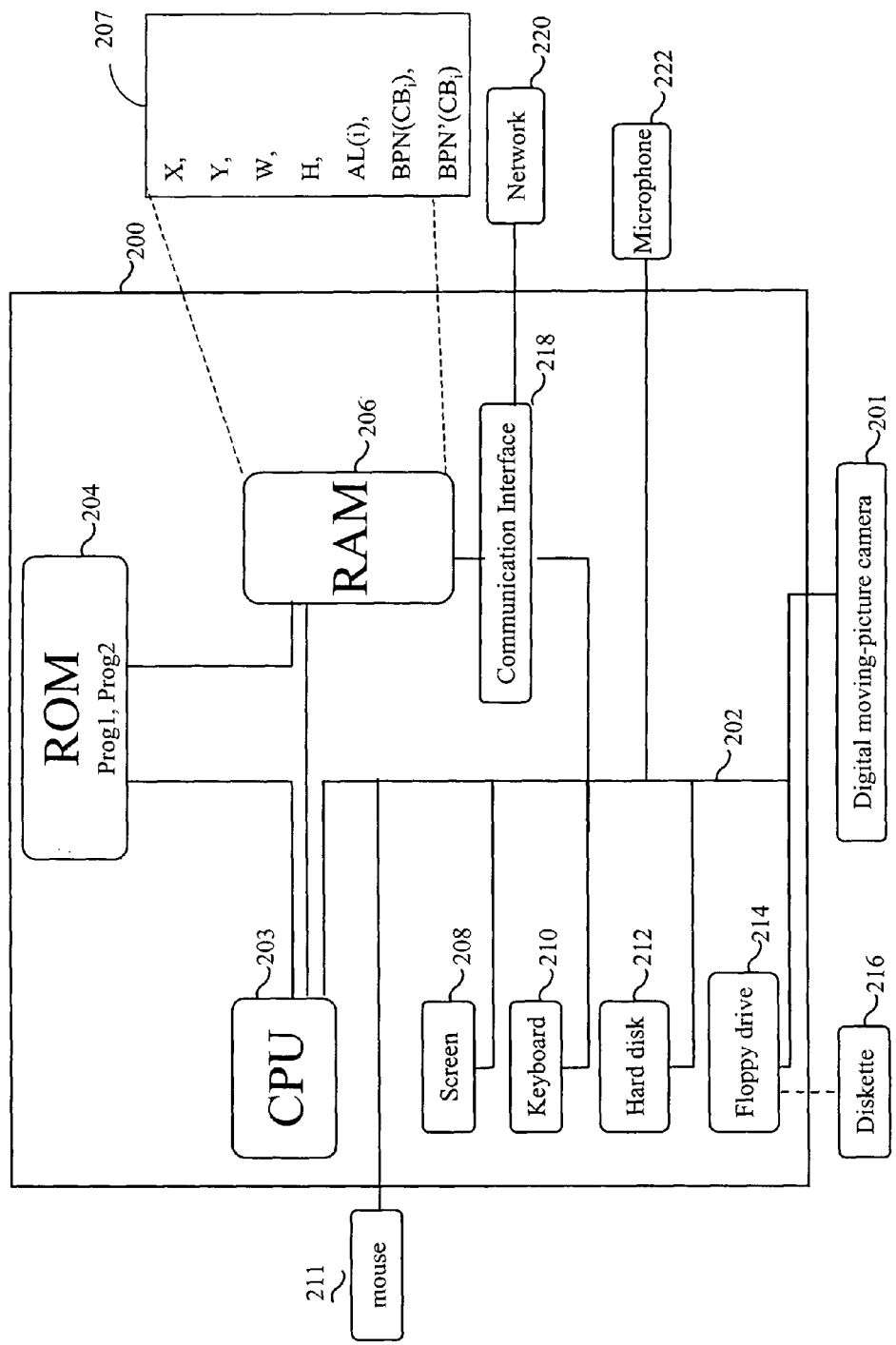

FIG. 3a provides a three-dimensional representation of the amplitudes of the samples of a code-block in a number of reference bitplanes;

FIG. 3b is a modified representation of FIG. 3a after modification according to the invention;

FIG. 4 is a representation of data packets of the same resolution of the bitstream of FIG. 2;

FIG. 5 is a transformation algorithm according to the invention of a digital signal for the purpose of its transmission;

FIG. 6 is a transformation algorithm according to the invention of a digital signal after its reception;

FIG. 7 is a diagram of a programmable apparatus in which the invention is implemented.

Figure 1:
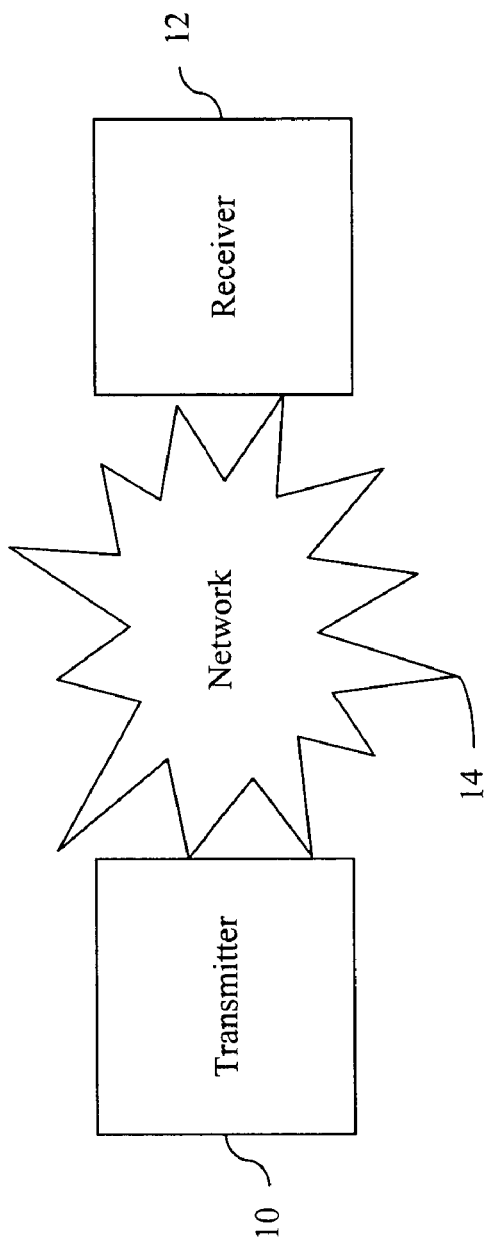
FIG. 1 is a diagram of a possible communication architecture in which the invention is implemented.

The invention relates to the transformation of a digital signal which may advantageously be implemented between two communication apparatuses, one being the transmitter, denoted 10 on FIG. 1, and the other being the receiver, denoted 12 on the same Figure, via a communication network 14.

In the context of the invention, the communication apparatus 10 has a digital signal which it wishes to transmit to the remote communication apparatus 12 via the network 14.

To do this, the apparatus 10 will, before the transmission, transform (encryption) the digital signal which will, for example, be compressed, in order to make it unusable in case it is received by an unauthorized recipient.

In the context of the invention, the communication apparatus 12 is the receiver of such a transformed signal and, as an authorized recipient, possesses the means which make it capable of performing on the received signal a transformation which is the reverse of that which it underwent in the apparatus 10.

This thus enables decryption of the signal to be performed in the apparatus 12 in order for an authorized user to be able to exploit the signal.

The invention has a particularly worthwhile application in the context of image signals and, still more particularly, when these are in accordance with the JPEG2000 standard.

It will be noted that, according to this standard, a compressed digital image signal comprises header data constituting a main header, tile header data according to which the signal is partitioned (a tile represents, in compressed manner, a rectangular portion of the image signal which always comprises at least one tile) and, for each tile, a tile body comprising data packets which are each constituted by packet header data and by a packet body.

The packet body contains in turn a plurality of compressed code-blocks which represent physical quantities which are the pixels of the image.

The packet header data contain in particular a list of all the blocks contained in the packet body.

Each compressed code-block is a compressed representation of an elemental rectangular portion of the image signal which has been decomposed, in known manner, into frequency sub-bands.

It should be noted that each code-block is compressed in several quality layers and each quality layer of a block is to be found in a distinct packet.

Furthermore, the aforementioned tiles are compressed independently.

Each data packet of an image signal in accordance with the JPEG2000 standard thus contains a set of compressed code-blocks each corresponding to a given tile, component (for example: luminance or chrominance), resolution level, quality layer and spatial position or "precinct".

As shown in FIG. 2, the bitstream of an image signal in accordance with the JPEG2000 standard comprises main header data denoted EN and data packets P(r,q), where r and q are integers respectively representing the resolution level and the quality layer of the packets.

It will be noted that, for reasons of simplicity, it is not necessary for the disclosure of the invention to take into account the other parameters which are the tiles, the components and the precincts in the signal.

The main header data EN comprise in particular the following information: the size of the image, the number of tiles formed in that image, the type of filter used for the decomposition into frequency sub-bands, the quantization step size and encoding parameters such as the organization of the bitstream used and the number of quality layers.

This information is useful at the time of the decompression operations performed on the bitstream which comprises compressed data.

The main header data also generally contains the information making it possible to obtain the number of reference bitplanes which depends on the signal and on its decomposition into frequency sub-bands.

More particularly, the number of reference bitplanes specific to a frequency sub-band is deduced from the number of bits on which the signal is encoded, from the number of decomposition levels and from the frequency sub-band considered.

In FIG. 2 the data packets are organized in quality layers: the first quality layer 1 corresponds to a given quality, for example 0.01 bpp (bit per pixel), while the following quality layers ..., j, ..., N contain additional data and correspond to higher qualities.

It will be noted that the representation of the bitstream is then said to be of progressive quality.

FIG. 3a is a diagram of the representation in bitplanes of the amplitudes of the four pixels forming a code-block.

As shown in that Figure, each pixel or digital sample representing the physical quantity which the pixel constitutes has an amplitude converted into binary form which is distributed in the form of 0 and 1 in the different bitplanes represented.

Note that it is not necessarily pixels of a code-block of which the amplitudes are represented in the form of bitplanes in FIG. 3a, but it may equally be digital samples representing these pixels and which are, for example, obtained from these latter by a decomposition into frequency sub-bands.

Note that the first bitplane denoted 101 represents the least significant bitplane, the following bitplanes 102 . . . 109 representing respectively the bitplanes of increasing significance.

In the example considered, the bitplanes 108 and 109 only contain 0's and are called zero bitplanes. In accordance with the JPEG2000 standard, in the packet header data of the image signal, an encoding parameter is present to indicate the number of zero bitplanes in order not to perform useless encoding of the zero values.

In the example under consideration, this encoding parameter is equal to 2.

It will be noted that the number of bitplanes 101 to 109 in FIG. 3a represents the number of reference bitplanes mentioned above, for example equal to 20, and that this number is the sum of the number of bitplanes according to which are encoded the amplitudes of the data of the signal (101 to 107), for example equal to 18, and of the number of zero bitplanes (108 and 109) which is, for example, equal to 2.

Thus, knowing the number of zero bitplanes according to the header data of the packet considered and deducing the number of reference bitplanes of the frequency sub-band under consideration from the main header data, the real number of bitplanes according to which are encoded the amplitudes of the data of the signal is easily obtained.

The latter information is of interest to the receiver of the signal since it enables it to restore the signal as it was before encryption. To do this, the receiver of the signal will have to know which region has been encrypted in order to search for the pertinent information in the main header data and in the header data of the packet concerned.

The parameter is next encoded in known manner in the form of a tag-tree in the packet header data.

This encoding technique is known in particular from the standard JPEG2000 ISO/IEC15444-1 "JPEG2000 Image Coding System" Annex B Section B.10.

Note that this encoding parameter appears solely when the code-block concerned contributes for the first time to a data packet.

It should also be noted that the concept of encoding which is considered here is different from that provided for the entropy encoding of data at the time of the compression operations of the image signal.

For reasons of simplicity, it will no longer be mentioned in what follows that the parameter is encoded in the packet header data.

In FIG. 3b the bitplanes 101 to 109 of FIG. 3a have been represented offset, after having artificially inserted two additional zero bitplanes 110 and 111.

Thus, from the point of view of the receiver of the signal transformed according to the invention, the number of reference bitplanes deduced from the information present in the main header data always being the same (20), the modified number (4) of zero bitplanes (108 to 111) which is supplied by the packet header data will mislead the receiver not authorized to receive this signal.

This is because the latter will deduce from what precedes that the number of bitplanes according to which are encoded the amplitudes of the data of the signal is 16 (bitplanes 101 to 105) whereas it is in fact 18 bitplanes.

Thus, at the time of the operations of decompression of the transformed signal, the non-authorized receiver will begin by dealing with the first non-zero bitplane, i.e. the bitplane denoted 107 in FIG. 3b, which it will consider as being the fifth bitplane from the distorted reference, and, from there, it will take into account solely the following 15 bitplanes to reach a total of 20.

Due to this, the bitplanes 101 and 102 will not be taken into account.

Moreover, given that two zero bitplanes 110 and 111 have been inserted, the offset caused at the level of the bitplanes gives rise, for each zero bitplane inserted, to a division of the amplitude of the samples by two and the quality of the restored signal will thus be degraded.

Furthermore, it should be noted that the degradation observed in the quality of the restored signal is accentuated by the fact that the modification made to each code-block varies from one block to another.

In FIG. 4, several data packets of the same resolution have been represented in more detail than in FIG. 2.

Each packet has been represented in the form of header data and of a packet body.

In the headers of packets 1, 2, 3 and N there are for example represented the parameters which supply, in the packet header data, the number of zero bitplanes for the block CBi considered, where i=1 to 8.

The parameters are thus denoted BPN (CBi).

As indicated above, for a data block under consideration, the parameter supplying the number of zero bitplanes is included in the header data of a packet when this block contributes for the first time to that packet. Although this code-block may later contribute to other data packets, the aforementioned parameter will not be included in the header data of these other packets.

It will be noted that, in the context of the invention, the digital signal to which the invention applies is decomposed into several regions which each contain digital data and that the signal comprises header data which are specific to each region.

The regions considered here within the meaning of the invention are, for example, code-blocks. The header data specific to each region are thus the packet header data.

It is also possible to consider that a region corresponds to a tile and that in this case the header data specific to the tile are the tile header data.

Nevertheless, a region within the meaning of the invention may also correspond, in a more general manner, to a spatial and/or frequential portion of the signal.

Within the meaning of the present invention, the packet header data comprise one or more parts each representing the amplitude of the data of a region considered, i.e. of a code-block.

In the example of packet 1, the data of packet 1 contain more particularly header data specific to each code-block CB1, CB5 and CB7 comprising a part, denoted respectively for the aforementioned blocks, BPN(CB1), BPN(CB5) and BPN(CB7), and which represents the amplitude of the data of the code-block considered.

FIG. 5 is an algorithm comprising different instructions or portions of code corresponding to steps of the method of transforming a digital signal according to the invention and which is implemented in the communication apparatus 10 of FIG. 1.

A computer program denoted "Prog 1" based on this algorithm is stored in the apparatus represented in FIG. 7 and which will be described later.

This program is stored in a read-only memory and, on initialization of the system, is transferred into a random access memory for the purpose of the execution of the program and thus of the implementation of the method according to the invention.

During the execution of this algorithm, the encryption is more particularly carried out of a digital signal which is, for example, compressed and which is here an image signal.

During a first step denoted S10, a decomposition into frequency sub-bands is carried out of a digital image signal which it is desired to transmit to the communication apparatus 12 of FIG. 1.

More particularly, during that step there is applied to the signal, for example, a wavelet transform (DWT).

Naturally, another transform may be applied such as a discrete cosine transform (DCT).

During the following step S11, a quantization of the coefficients output from the decomposition into frequency sub-bands of the image signal is carried out.

Each frequency sub-band is next divided into several code-blocks of rectangular form.

The algorithm of FIG. 5 next comprises a step S12 of entropy encoding of the code-blocks obtained at the preceding step.

During this entropy encoding step, each block is encoded independently and for each of them the number of zero bitplanes found is stored in memory. Thus, in the example represented in FIG. 3a, this number is equal to 2.

Moreover, it will be noted that further to the decomposition into frequency sub-bands of the image signal, the number of reference bitplanes is known for each sub-band.

This information present in the main header data of the signal will be transmitted with the signal to the communication apparatus 12 of FIG. 1 which will then, with the help of the latter and of the information on the portion or region of the signal which has been encrypted, find the number of zero bitplanes of each code-block of the original image signal and thus proceed with a decryption of this signal.

The algorithm of FIG. 5 further comprises a step S13 during which an allocation of rate is performed, in the sense that the data or samples contained in the different code-blocks are distributed in the data packets.

During this step, the packet header data are provisionally created, and the body of these packets is definitively created.

It should be noted that the aforementioned steps correspond to the steps which are conventionally performed in an encoder in accordance with the JPEG2000 standard.

During the following step S14, the algorithm of FIG. 5 provides for the generation of a pseudo-random sequence based on a secret transformation key denoted Ku.

Note that the transformation key depends on the characteristics of the apparatus which sends out the signal as well as on the region or regions of the image signal to be encrypted (resolution, precinct).

The secret transformation key Ku is generated during a step S15.

The secret transformation key is used as "seed" in the pseudo-random sequence generator. On execution of step S14, the pseudo-random sequence generated will take integer values between 0 and M, where M is an integer serving as modulation parameter.

This modulation parameter is known both to the transmitter apparatus (apparatus 10 of FIG. 1) and to the receiver apparatus (apparatus 12 of FIG. 1). Note that this parameter could equally be encoded over a specific number of bits in the secret transformation key which will be identical for the transmitter apparatus and for the receiver apparatus.

The pseudo-random sequence generated has a length equal to the number of code-blocks concerned by the transformation according to the invention.

These code-blocks constitute, in the example embodiment described, regions in the sense of the present invention.

As shown in FIG. 5, the algorithm comprises a step S16 during which the size information of the portion or region of the signal to be encrypted (X, Y, W, H) as well as the number N of resolutions are determined.

This information is, for example, selected by the user of the transmitter communication apparatus.

It will be noted that this information may be either independently transmitted to the receiver communication apparatus in a secure manner, or be included in the secret transformation key Ku which will be transmitted at step S21, by using a number of bits supplied by the size of the image signal and the number of decomposition levels as indicated below. The size information of the part of the signal to be scrambled and the number N of resolutions are encoded in the following manner:

X encoded over $\log_2$ (width of the image) bits
Y encoded over $\log_2$ (height of the image) bits
W encoded over $\log_2$ (width of the image) bits
H encoded over $\log_2$ (height of the image) bits
N encoded over $\log_2$ (number of decomposition levels) bits Example: let there be an image of width 2560 and height 5420 encoded on 6 resolution levels in which the region of scrambling is situated at X=350 and Y=400 with a width of 2000 and a height of 1500.

X will then be encoded over $\log_2(2560)$, i.e. 11 bits
Y will then be encoded over $\log_2(5420)$, i.e. 12 bits
W will then be encoded over $\log_2(2560)$, i.e. 11 bits
H will then be encoded over $\log_2(5420)$, i.e. 12 bits
N will then be encoded over $\log_2(6)$, i.e. 3 bits.

The secret transformation key Ku will thus contain 49 bits to specify the part of the image signal which will be encrypted as well as the resolutions concerned.

Furthermore, the key will contain additional bits, for example 128 bits, to generate the pseudo-random sequence.

The portion of the image signal destined to be encrypted is defined in the image signal at full resolution.

This portion of the signal contains a plurality of code-blocks which here are the regions within the meaning of the present invention and which must be encrypted at the different resolutions.

In order to determine the code-blocks contained in the portion of the signal to be encrypted, this portion of the signal is projected into the different frequency sub-bands obtained at step S10 of the algorithm (step S17).

During this step S17, the code-blocks of the resolutions concerned and which are included in the portion of the signal projected into the different frequency sub-bands supply a list of code-blocks LCB corresponding to the portion of the signal to be encrypted.

The algorithm comprises a step S18 during which are modified, among the header data of the data packets containing the contributions of the code-blocks of the list LCB, the parts of these header data that represent the amplitude of the data contained in the code-blocks considered.

This modification is carried out using the pseudo-random sequence containing the values from 0 to M and which was generated at step S14.

More particularly, during step S18, the parameter is modified which indicates the number of zero bitplanes for the code-blocks present in the list LCB, that is to say the blocks which are included in the part of the signal to be encrypted and in the resolutions concerned.

Note that an encryption may be performed solely on one resolution of the signal.

As shown in FIG. 4, the parameters to which relate the modifications in the packet header data are those denoted BPN(CBi), with i=1 to 8 in the example embodiment considered.

Note that the code-blocks will be processed in a specific order i.e., for example, starting with the blocks contributing the first resolution which corresponds to the lowest definition of the image signal.

The code-blocks contributing a given resolution will be processed in a natural order of going through line by line and from top to bottom.

This natural order of going through is termed "raster scan".

The modification of the parameter BPN providing the number of zero bitplanes of the code-block CB(i) belonging to the list of the blocks LCB is performed in the following manner:

$$BPN'(CBi)=[BPN(CBi)+AL(i)], \text{ where } AL(i) \, [0,M]$$

It should be noted that the value of the modulation parameter M is chosen such that the modified value of the number of zero bitplanes BPN'(CBi) does not exceed the number of reference bitplanes.

Note that the modification made to the number of zero bitplanes of the amplitudes of the samples or data of each code-block consists, for example, of changing the parameter BPN from the value 2 in the example of FIG. 3a to the value 4 in the example of FIG. 3b.

Note that for each code-block it is possible to differently modify the number of zero bitplanes of the amplitudes of the samples or data of the block considered.

This provides encryption that is still more effective than if the same modification is made for each block since heterogeneity is thus produced in the encrypted signal.

Generally, the BPN values of the blocks selected are modified independently of each other.

However, by way of variant, it is also possible to modify the value BPN (CBi) by taking into account, for example, the BPN values of the preceding blocks in the natural order of going through the bitstream.

At the outcome of step S18 of the algorithm of FIG. 5, the values of the parameters providing the number of zero bitplanes for the code-blocks considered corresponding to the packets 1, 2, 3 and N of FIG. 4 are then modified to take into account the new values of the parameters for the code-blocks considered.

Note that the invention advantageously makes it possible not to touch the actual data which are in the bodies of the packets.

The transformation of the signal according to the invention is thus simpler and more rapid than the methods provided by the prior art. Furthermore, the transformation envisaged according to the invention is very flexible in that it can be performed on code-blocks or, more generally, on portions or regions of the signal (for example tiles in the case of a JPEG2000 image signal) which are judiciously chosen.

Thus the user may for example select, as seen earlier, a portion or precinct of the image signal in order to encrypt it.

Moreover, when a signal comprises a number N of resolutions, it is possible to carry out an encryption of the resolutions N to k, while the lowest resolutions (resolutions (k−1) to 1) are not encrypted.

During step S19, the algorithm of FIG. 5 makes provision for carrying out an encoding of the packet header data in the form of a tag-tree, as specified in the JPEG2000 standard mentioned above.

Thus, the new values of the parameters BPN'(CBi) are the newly encoded values.

During the following step S20, the transformed digital signal is generated including the different header data (main header data and header data of tiles), as well as all the data packets comprising more particularly, the unmodified data packets and the modified packets.

Among the modified packets in the transformed signal are to be found, for each packet, the modified header data and the packet body which itself has not been modified.

In the example embodiment in which the image signal is in accordance with the JPEG2000 standard, the encrypted image signal generated at step S20 conforms to the description syntax of the JPEG2000 standard, but it will not be possible for it to be decoded in an intelligible manner in an unauthorized receiver apparatus, since the signal had been scrambled before its transmission.

During the following step S21, the transformed (encrypted) image signal is transmitted over the network 14 of FIG. 1 with, for example, the key Ku which carries within itself the information on the encrypted region or regions.

The algorithm of FIG. 6 comprises different instructions or portions of code corresponding to steps of the method of reverse transformation according to the invention and which is implemented in a communication apparatus which is a receiver of a transformed signal, such as the communication apparatus 12 of FIG. 1.

A computer program denoted "Prog 2" based on this algorithm is stored in the communication apparatus of FIG. 7 which will be described later.

The execution of this computer program makes it possible to implement the method according to the invention in the communication apparatus that is a receiver of a transformed signal.

The algorithm of FIG. 6 comprises a first step S29 during which the reception is undertaken of the transformed (encrypted) signal coming from the apparatus 10 of FIG. 1.

The following step S30 makes provision for an analysis of the bitstream constituting the encrypted image signal received by the apparatus executing that algorithm.

More particularly, the data packets of the encrypted image signal are extracted from this bitstream, as well as the size of the image signal provided by the main header data.

During the following step S31, the header data of the data packets are decoded in a manner that is the reverse of the encoding provided for at step S19 of the algorithm of FIG. 5.

During the following step S32, the pseudo-random sequence is generated from the secret transformation key Ku received from the transmitter apparatus, in an identical manner to that described with reference to FIG. 5.

Note that the secret transformation key Ku is transmitted from the transmitter communication apparatus (apparatus 10 of FIG. 1) to the receiver communication apparatus (communication apparatus 12) by secure means known to the person skilled in the art.

During the following step S33, the transformation key Ku makes it possible to determine the portion or region of the image signal which was encrypted and the number of resolutions concerned.

More particularly, by virtue of the size of the image signal obtained at step S30 and the transformation key, it is possible to retrieve the list of the code-blocks LCB encrypted in the different resolutions.

It should be noted that what is meant by encrypted code-block is the code-block for which a part of the header data of the packets to which these blocks contribute have been modified according to the meaning of the present invention, as was seen earlier in the description of the algorithm of FIG. 5.

This list of blocks is provided at step S34 of the algorithm of FIG. 6.

During the following step S35, a modification that is the reverse of that adopted in FIG. 5 is performed on the appropriate parts of the packet header data which were modified in the transmitter apparatus.

More particularly, the numbers are modified of zero bitplanes of the samples or data of the different code-blocks of the aforementioned list LCB according to the following formula:

$$BPN(CBi)=(BPN'(CBi)-AL(i)),$$

in which BPN'(CBi) is the parameter providing the number of zero bitplanes encoded in the packet header data for the code-block CBi considered.

AL(i) is the value of the pseudo-random sequence and BPN(CBi) is the parameter providing the number of decrypted zero bitplanes which thus corresponds to the initial value before encryption.

At the outcome of this step, all the data packets of which a part of the header data had been modified during the encryption process resume the initial values of the number of zero bitplanes for the code-blocks considered, these being the values before encryption.

Thus the number of zero bitplanes of the data or samples of the code-block represented in FIG. 3b is brought back to the value represented in FIG. 3a, i.e. 2.

During the following step S36, an entropy decoding is carried out of the different code-blocks of the image signal (a step which is reverse to step S12 of FIG. 5).

During steps S37 and S38, the operations are respectively performed of dequantization and of reverse transformation which correspond respectively to the operations that are reverse to those performed at steps S11 and S10 of the algorithm of FIG. 5.

As a variant, different resolutions of a digital signal may be encrypted with a secret transformation key for each resolution in order to better take into account the resolutions and data concerned in each of the resolutions.

In order not to have to manage a number of keys equal to the number of resolutions considered, a first key may be used and the other keys be deduced from the first by invoking, for example, hash functions.

Such functions are provided below by way of example:

K2=Hash(K1)

K3=Hash (K2)=Hash (Hash (K1))

K4=Hash (K3)=Hash (Hash (K2))=Hash (Hash (Hash (K1)))

As has just been seen in the description made with reference to FIGS. 5 and 6, the transformation envisaged by the invention, whether it concerns encryption at the transmitter or decryption at the receiver, does not jeopardize the respective conventional operations of compression and decompression of the digital signal.

The invention can thus be perfectly well integrated into a system involving a conventional encoder and decoder, which does not call into question the entire procedure of processing of a signal before its transmission and of processing of the signal once received.

Moreover, in that it is possible to carry out an encryption of the finest resolution levels of a signal while leaving the lowest resolution levels non-encrypted, it is possible in a way to control the access to the resolutions corresponding to the finest definitions of the signal.

With reference to FIG. 7, an example of a programmable communication apparatus implementing the invention is described.

Each of the communication apparatuses of FIG. 1 is, for example, identical to the apparatus of FIG. 7 and has the means which enable it to implement the invention.

The apparatus of FIG. 7 comprises a device for transformation (encryption or decryption) of a digital signal of the invention according to whether the apparatus is the apparatus 10 or 12 of FIG. 1.

According to the chosen embodiment shown in FIG. 7, an apparatus implementing the invention is for example a microcomputer 200 or a workstation connected to different peripherals, for example a digital moving image camera 201 (or a scanner, or any means of acquiring or storing an image) connected to a graphics card and supplying digital data to the apparatus.

The apparatus 200 comprises a communication bus 202 to which there are connected:

- a central processing unit 203 (microprocessor),
- a read only memory 204, able to contain the computer programs "Prog1" and "Prog2",
- a random access memory 206 comprising registers 207 adapted to store variables and parameters created and modified during the execution of the aforementioned programs, in particular X, Y, W, H, AL (i), BPN (CBi) and BPN'(i) mentioned with reference to the preceding Figures, and the data packets processed during the execution of the different preceding algorithms.
- a screen 208 for displaying data and/or serving as a graphical interface with the user, who will be able to interact with the programs according to the invention, using a keyboard 210 or any other means such as a pointing device, for example a mouse 211 or an optical stylus,
- a hard disk 212, able to contain the aforementioned programs "Prog1" and "Prog2",
- a floppy disk drive 214 adapted to receive a diskette 216 and to read or write thereon digital data processed or to be processed according to the invention,
- a communication interface 218 connected to a distributed communication network 220, for example the Internet, the interface being able to transmit and receive digital data.

In the case of audio data, the apparatus further comprises an input/output card (not shown) connected to a microphone 222.

The communication bus allows communication and interoperability between the different elements included in the microcomputer 200 or connected to it. The representation of the bus is non-limiting and, in particular, the central processing unit is liable to communicate instructions to any element of the microcomputer 200 directly or by means of another element of the microcomputer 200.

The executable code of each program enabling the programmable apparatus to implement the processes of FIGS. 5 and 6 according to the invention may be stored, for example, on the hard disk 212 or in read-only memory 204 as shown in FIG. 7.

According to a variant, the diskette 216 can contain data as well as the executable code of the aforementioned programs which, once read by the apparatus 200, will be stored on the hard disk 212.

As a second variant, the executable code of the programs can be received by the intermediary of the communication network 220, via the interface 218, in order to be stored in an identical fashion to that described previously.

The diskettes can be replaced by any information carrier such as a compact disc (CD-ROM) or a memory card. Generally, an information storage means, which can be read by a computer or microprocessor, integrated or not into the apparatus, and which may possibly be removable, is adapted to store one or more programs whose execution permits the implementation of the method according to the invention.

More generally, the program or programs may be loaded into one of the storage means of the apparatus 200 before being executed.

The central processing unit 203 will control and direct the execution of the instructions or portions of software code of the program or programs according to the invention, these instructions being stored on the hard disk 212 or in the read-only memory 204 or in the other aforementioned storage elements. On powering up, the program or programs which are stored in a non-volatile memory, for example the hard disk 212 or the read-only memory 204, are transferred into the random-access memory 206 (RAM), which will then contain the executable code of the program or programs according to the invention, as well as registers for storing the variables and parameters necessary for implementation of the invention.

It should be noted that the communication apparatus comprising the device according to the invention can also be a programmed apparatus.

This apparatus then contains the code of the computer program or programs for example fixed in an application specific integrated circuit (ASIC).

The invention claimed is:

1. A method of scrambling a digital signal, comprising the steps of:

decomposing the digital signal into a plurality of regions, each region containing digital data;

encoding the digital signal in a format comprising header data specific to each region, the header data including a parameter representing a number of bitplanes of samples of a corresponding region; and modifying the parameter to cause an erroneous value of an amplitude of the samples, thereby causing the digital signal to be degraded, wherein the digital data of the digital signal are digital samples representing physical quantities, and wherein the number of bitplanes includes a number of zero bitplanes and a number of non-zero bitplanes, and the number of bitplanes are encoded based on the difference between (1) a number of reference bitplanes and (2) the number of zero bitplanes.

2. A method according to claim 1, wherein said modifying step includes modifying a portion of the parameter representing the number of zero bitplanes.

3. A method according to claim 2, wherein said modifying step includes increasing the portion of the parameter representing the number of zero bitplanes.

4. A method according to claim 1, further comprising a step of transmitting the digital signal after said encoding and modifying.

5. A method according to claim 1, further comprising: generating at least one transformation key Ku.

6. A method according to claim 5, wherein the transformation key Ku depends on the at least one region considered.

7. A method according to claim 5, further comprising the step of generating a pseudo-random sequence based on the at least one transformation key Ku.

8. The method according to claim 7, wherein modifying the parameter is performed in accordance with:

$$BPN'(Cbi)=[BPN(Cbi)+AL(i)], \text{ where } AL(i) \, [0,M],$$

where BPN'(Cbi) is the parameter providing a number of zero bitplanes encoded in the packet header data for corresponding region CBi, AL(i) is a value of the pseudo-random sequence, BPN(Cbi) is a parameter providing a number of zero bitplanes, M is an integer representing a modulation parameter, and i is an integer.

9. A method according to claim 5, further comprising a step of transmitting the at least one transformation key Ku onto a network to a receiver.

10. A method of descrambling a digital signal, the method comprising the steps of:
receiving a digital signal decomposed into a plurality of regions, each region containing digital data, the digital signal being encoded in a format comprising header data specific to each region, the header data including a modified version of a parameter representing a number of bitplanes of samples of a corresponding region, the parameter having been modified to cause an erroneous value of amplitude samples to cause the digital signal to be degraded upon decoding, wherein the digital data of the digital signal are digital samples representing physical quantities, and wherein the modified version of the parameter includes a modified number of bitplanes including a modified number of zero bitplanes and a number of non-zero bitplanes, and the modified number of bitplanes are encoded based on the difference between (1) a number of reference bitplanes and (2) the modified number of zero bitplanes; and modifying in reverse the modified version of the parameter to restore the parameter representing a number of bitplanes of samples of a corresponding region.

11. A method according to claim 10, wherein said step of modifying in reverse includes modifying the modified number of zero bitplanes.

12. A method according to claim 10, wherein said step of reverse modifying includes reducing the modified number of zero bitplanes.

13. A method according to claim 10, wherein said step of reverse modifying uses at least one transformation key Ku to determine at least one region of the digital signal that has been encrypted.

14. A method according to claim 13, wherein said the transformation key Ku corresponds to a number of resolutions of the at least one region.

15. A method according to claim 13, wherein said step of reverse modifying includes generating a pseudo-random sequence based on the transformation key Ku.

16. A method according to claim 13, further comprising receiving the transformation key Ku from a transmitter.

17. A device for scrambling a digital signal, comprising:
a processor coupled to a memory storing code, which when executed by the processor, causes the processor to perform the steps of:
decomposing the digital signal into a plurality of regions, each region containing digital data;
encoding the digital signal in a format comprising header data specific to each region, the header data including a parameter representing a number of bitplanes of samples of a corresponding region; and
modifying, the parameter to cause an erroneous value of an amplitude of the samples, thereby causing the digital signal to be degraded,
wherein the digital data of the signal are digital samples representing physical quantities, and
wherein the number of bitplanes includes a number of zero bitplanes and a number of non-zero bitplanes, and the number of bitplanes are encoded based on the difference between (1) a number of reference bitplanes and (2) the number of zero bitplanes.

18. A device according to claim 17, wherein said modifying modifies a portion of the parameter representing the number of zero bitplanes.

19. A device according to claim 18, wherein said modifying increases the portion of the parameter representing the number of zero bitplanes.

20. A device according to claim 17, further comprising a transmitter operable to transmit the digital signal after said encoding and modifying.

21. A communication apparatus, comprising a device for scrambling a digital signal according to claim 17.

22. A device according to claim 17, wherein the code further contains instructions for causing the processor to perform the step of generating at least one transformation key Ku.

23. A device according to claim 22, wherein the transformation key Ku depends on the at least one region considered.

24. A device according to claim 22, wherein the memory further stores code, which when executed by the processor performs the step of generating a pseudo-random sequence based on the transformation key Ku.

25. The device according to claim 24, wherein modifying the parameter is performed in accordance with:

$$BPN'(CB)=[BPN(CB)+AL(i)], \text{ where } AL(i) \, [0,M],$$

where BPN'(Cbi) is the parameter providing a number of zero bitplanes encoded in the packet header data for corresponding region CBi, AL(i) is a value of the pseudo-random sequence, BPN(Cbi) is a parameter providing a number of zero bitplanes, M is an integer representing a modulation parameter, and i is an integer.

26. A device according to claim 22, further comprising a transmitter operable to transmit the transformation key Ku.

27. A device for descrambling a digital signal decomposed into a plurality of regions, each region containing digital data, the digital signal being encoded in a format comprising header data specific to each region, the header data including a modified version of a parameter representing a number of bitplanes of samples of a corresponding region, the parameter having been modified to cause an erroneous value of amplitude samples to cause the digital signal to be degraded upon decoding, the device comprising:
a processor coupled to a memory storing code, which when executed by the processor. causes the processor to perform the steps of:

receiving the digital signal; and reverse modifying the modified version of the parameter to restore the parameter representing a number of bitplanes of samples of a corresponding region.

28. A communication apparatus, comprising a device for descrambling a digital signal according to claim 27.

29. A computer-readable medium which can be read by a computer or a microprocessor, the computer-readable medium storing code instructions of a computer program, which when executed by the computer or microprocessor, cause the computer or microprocessor to execute the steps of a method of scrambling a digital signal, the method comprising the steps of:

decomposing the digital signal into a plurality of regions, each region containing digital data;

encoding the digital signal in a format comprising header data specific to each region, the header data including a parameter representing a number of bitplanes of samples of a corresponding region; and modifying the parameter to cause an erroneous value of an amplitude of the sampels, thereby causing the digital signal to be degraded.

30. A computer-readable medium information storage means which can be read by a computer or a microprocessor, the computer-readable medium storing code instructions of a computer program, which when executed by the computer or microprocessor, cause the computer or microprocessor to execute the steps of a method of descrambling a digital signal, the method comprising the steps of:

receiving a digital signal decomposed into a plurality of regions, each region containing digital data, the digital signal being encoded in a format comprising header data specific to each region, the header data including a modified version of a parameter representing a number of bitplanes of samples of a corresponding region, the parameter having been modified to cause an erroneous value of amplitude samples to cause the digital signal to be degraded upon decoding, wherein the digital data of the digital signal are digital samples representing physical quantities, and wherein the number of bitplanes includes a number of zero bitplanes and a number of non-zero bitplanes, and the number of bitplanes are encoded based on the difference between (1) a number of reference bitplanes and (2) the number of zero bitplanes; and modifying in reverse the modified version of the parameter to restore the parameter representing a number of bitplanes of samples of a corresponding region.

* * * * *